United States Patent [19]

Strasser

[11] Patent Number: 5,740,292
[45] Date of Patent: Apr. 14, 1998

[54] MODE COUPLING OPTICAL WAVEGUIDE GRATING

[75] Inventor: Thomas A. Strasser, Chatham, N.J.

[73] Assignee: Lucent Technologies Inc., Murray Hill, N.J.

[21] Appl. No.: 712,694

[22] Filed: Sep. 12, 1996

[51] Int. Cl.$^6$ ........................... G02B 6/34
[52] U.S. Cl. ............... 385/37; 385/28; 372/6
[58] Field of Search ............... 385/28, 29, 37, 385/10; 372/6

[56] References Cited

U.S. PATENT DOCUMENTS

| | | | |
|---|---|---|---|
| 4,828,350 | 5/1989 | Kim et al. | 385/37 |
| 4,986,624 | 1/1991 | Sorin et al. | 385/30 |
| 5,048,913 | 9/1991 | Glenn et al. | 385/37 |
| 5,104,209 | 4/1992 | Hill et al. | 385/27 |
| 5,216,739 | 6/1993 | Hill et al. | 385/123 |
| 5,638,473 | 6/1997 | Byron | 385/37 |

OTHER PUBLICATIONS

R. Kashyap et al., "Wideband Gain Flattened Erbium Fibre Amplifier Using A Photosensitive Fibre Blazed Grating", *Electronics Letters*, vol. 29(2), p. 154 (Jan. 1993).

C-X Shi et al., "Mode conversion based on the periodic coupling by a reflective fibre grating", *Optics Letters*, vol. 17(23), p. 1655 (Dec. 1992).

T. Erdogan et al., "Tilted fiber phase gratings", *J. Optical Soiety of America*, vol. 13(2), p. 296 (Feb. 1996).

T. A. Lenahan et al., "Calculation of Modes in an Optical Fiber Using the Finite Element Method and EISPACK", *Bell System Technical Journal*, vol. 62, p. 2663 (1983). No month available.

*Primary Examiner*—Rooney B. Bovernick
*Assistant Examiner*—Hemang Sanghavi
*Attorney, Agent, or Firm*—Eugen E. Pacher

[57] ABSTRACT

Reflective mode coupling refractive index gratings are disclosed. The gratings can couple light of wavelength $\lambda_i$ in a fundamental spatial mode of the waveguide (e.g., $LP_{01}$ to a reflected higher order spatial mode (e.g., $LP_{11}$), substantially without reflection of any light of wavelength $\lambda_j \neq \lambda_i$ in a spectral range $\Delta\lambda \leq 0.01 \lambda_i$. The mode coupling gratings (MCGs) can find a variety of uses in optical waveguide systems. Exemplarily, an MCG can serve as a wavelength-dependent loss element with abrupt (e.g., ~1 nm) spectral dependence. However, a chirped grating with or without strength modulation can yield an MCG having relatively wide spectral dependence, including variable loss over a relatively wide (e.g., ~10 nm) spectral range. Both types of MCGs are advantageously used in, for instance, optical waveguide amplifiers.

18 Claims, 5 Drawing Sheets

MODE COUPLING OPTICAL WAVEGUIDE GRATING

CROSS-REFERENCE TO RELATED APPLICATIONS

This application is related to concurrently filed co-assigned U.S. patent application Ser. No. 08/212,697 by T. A. Strasser et al., titled Optical Waveguide System Comprising a Mode Coupling Grating and a Mode Discriminating Coupler incorporated herein by reference.

FIELD OF THE INVENTION

This invention pertains to optical waveguide gratings, more specifically, to articles and systems (collectively "icles") at comprise a mode coupling waveguide grating, exemplarily a multi-wavelength optical communication system.

BACKGROUND OF THE INVENTION

In a view of optic communication systems, optical fiber simultaneously carries electromagnetic radiation of a plurality of different wavelengths. Among such systems are wavelength division multiplexed (WDM) systems. In WDM systems it is, for instance, frequently required to add a transmission channel onto the fiber or to selectively remove a channel from the fiber. Both functions usury have to be performed at a plurality of locations along the transmission path, commonly known as access points or nodes. Channels are added for transmission and removed at the destination.

As disclosed in the above-referenced concurrently filed co-assigned U.S. patent application by T. A. Sifter et al., a particularly advantageous add/drop multiplexing device is an all-fiber device at comprises a mode discriminating coupler (MDC) and at least one improved mode coupling grating (MCG). MDCs and MCGs as such are known. See, for instance, U.S. Pat. No. 4,828,350 ('350) regarding MDC, and U.S. Pat. No. 5,104,209 ('209) regarding a prior MCG. See so U.S. Pat. No. 5,216,739, a continuation-in-part of the '209 patent.

FIG. 11 of the '350 patent, together with associated text at columns 13–15, discloses a combination of an MDC (814; referred to a "mode selector") and MCG (820; referred to as a "grating reflector"), the latter as described in U.S. Pat. No. 4,986,624. Briefly, the grating reflector comprises a mechanical grating that is urged against a planar surface of appropriately prepared optical fiber, such that the grating is within the evanescent field of the fiber. Such a grating reflector has shortcomings. For instance, it will exhibit undesirable polarization dependence, is typically difficult to manufacture and, in consequence of its non-integrated structure, will generally have relatively low reliability. Finely, it will typically be subject to unwanted reflections, of the type at will be described below.

According to '350, FIG. 11 depicts a system that separates fight of a particular wavelength, e.g., $\lambda_1$, from light at wavelengths $\lambda_1, \lambda_2, \ldots \lambda_N$. The inventors thus considered the system capable of performing the drop function in a WDM optical fiber communication system.

The '209 patent discloses blazed optical fiber gratings that can act as mode converters that exemplarily convert $LP_{01}$ radiation of a given wavelength $\lambda_i$ to $LP_{11}$ radiation of the same wavelength, with the two modes propagating in the same direction. The patent discloses that such "transmissive" $LP_{01}/LP_{11}$ mode converters have a complicated spectral response with many peaks, and that single peak spectral response requires two-mode fibers in which the higher order mode has only one mode constituent. The '209 patent teaches that this can be accomplished by means of a special two-mode fiber, e.g., a fiber having an elliptical core. In the alternative, it is taught that transmissive $LP_{01}/LP_{02}$ mode conversion, with $LP_{02}$ being a single mode, can provide single peak response. The gratings of the '209 patent are formed by line-by-line exposure of the fiber to UV radiation through a slit in a mask. The slit was 12 μm wide, and angled at an angle $\theta$ in the range 2°–3° with respect to the fiber axis. The gratings thus were blazed long period (transmissive) gratings.

As had been observed by the inventors of the '209 patent, the transmissive $LP_{01}/LP_{02}$ mode converter of that patent had a complicated wavelength spectral response. This is because the two degenerate components of the $LP_{11}$ mode couple differently. Such a response would severely reduce the usefulness of a mode converter in a WDM or other multi-wavelength system. The solutions proposed by the inventors of '209, namely, use of a fiber with elliptical core, or use of a $LP_{01}/LP_{02}$ mode converter, have drawbacks. For instance, such elliptical fiber is not generally available and, in any case, would be expensive, and a $LP_{01}/LP_{02}$ MCG typically is less useful in a multi-wavelength system than a $LP_{01}/LP_{11}$ MCG because the greater number of modes typically leads to additional reflections at other wavelengths.

Accordingly, in multi-wavelength optical waveguide systems there is a need for a relatively inexpensive MCG that does not suffer from the drawbacks of prior art MCGs. Indeed, such a component would have a variety of uses in optical waveguide systems. This application discloses such a MCG.

R. Kashyap et at., *Electronics Letters*, Vol. 29(2), p. 154 (January 1993) disclose an erbium doped optical fiber amplifier that uses a blazed grating in single mode fiber as a wavelength selective loss element.

C.-X. Shi et al., *Optics Letters*, Vol. 17(23), p. 1655 (December 1992) give theoretical results for a $LP_{01}/LP_{02}$ reflective mode coupling grating.

T. Erdogan et at., *J. Optical Society of America*, Vol. 13(2), p. 296 (February 1996) provide a review of blazed fiber phase gratings in single mode fiber.

U.S. Pat. No. 5,048,913 discloses an optical waveguide mode discrimination filter that comprises an unblazed grating.

Glossary and Definitions

The spatial modes of the electromagnetic field in an optical waveguide will herein be designated in the conventional manner. For instance, the spatial modes in a conventional (i.e., circularly symmetric) optical fiber will be designated $LP_{01}, LP_{11}, LP_{02}, \ldots$, with $LP_{01}$ being the fundamental mode, $LP_{11}$ the first higher order mode, etc.

The modes in waveguides other than (circularly symmetric) optical fibers (e.g., planar waveguides) will, if required, also be designated in conventional manner.

For ease of exposition, the $LP_{01}$ mode will be designated "(0,1)", the $LP_{11}$ mode will be designated "(1,1)", and in general the $LP_{m,n}$ mode (m>0, n>1) will be designated "(m, n)".

The electromagnetic radiation of interest herein will frequently be referred to as "fight", although the radiation typically is infrared radiation. This is for ease of exposition only, and does not imply any wavelength restriction.

By "optimal coupling" between two spatial modes, e.g. (0,1) and (m,n) at a given wavelength (e.g., $\lambda_i$) herein is meant the maximum possible amount of coupling between the modes for a given periodic index modulation.

SUMMARY OF THE INVENTION

The invention will be described in terms appropriate for a particular type of optical waveguide, namely, conventional optical fiber. However, those skilled in the art will recognize that the invention is not limited to such optical fiber, but can readily be embodied in other guiding structures, e.g., in planar waveguides having substantially rectangular core cross section. Such waveguides typically have optical properties that are polarization dependent (i.e., dependent on the orientation of the electric field vector). Such a waveguide has a fundamental mode that is symmetric (designated $TX_{00}$, where X=E or M, depending on polarization), as well as higher order modes ($TE_{01}$ or $TM_{01}$, for example). My invention is directly applicable to such a waveguide structure, as the problems and solutions for mode conversion in such a waveguide structure are substantially the same as in the optical fiber case, described in detail below.

I have discovered a significant shortcoming of, at least, conventional MCGs for coupling an even and an odd spatial mode of an optical waveguide, exemplarily an optical fiber. Such MCGs, for efficient coupling, almost by necessity have a blazed grating. The shortcoming reveals itself in WDM systems (more generally, in MCGs that are during operation exposed to electromagnetic radiation of two or more relatively closely spaced wavelengths) and has the potential of making impractical the use of, otherwise advantageous, MCGs in such multi-wavelength systems.

I have observed that the presence of radiation of several wavelengths (e.g., $\lambda_1, \lambda_2, \ldots, \lambda_N$, $N \geq 2$) in a relatively narrow wavelength region $\Delta\lambda$ (exemplarily $\geq \lambda_1/100$) in a MCG can result in additional and undesirable mode coupling. For instance, a blazed grating of a particular pitch A and blaze angle $\theta$ may facilitate not only the desired coupling between the (0,1) and (1,1) modes at a predetermined wavelength $\lambda_i$, but also undesired coupling between forward and backward propagating (0,1) modes (i.e., reflection) at $\lambda_j$ (i not equal to j, both i and j in 1,2, ..., N). Such a situation would typically be unacceptable in, e.g., a WDM communication system.

I have not only recognized a, apparently previously unrecognized, problem but have also found a way to overcome the problem, as will be described in detail below.

In a broad aspect the invention is embodied in a novel blazed MCG that, upon exposure to the requisite light, not only causes efficient reflective coupling of the (0,1) spatial mode and a higher order spatial mode (m,n), advantageously (1,1), at $\lambda_i$ but causes relatively low (desirably substantially no) reflection of (0,1) at any wavelength $\lambda_j$ within the spectral range $\Delta\lambda$ that includes $\lambda_i$.

More specifically, the invention is embodied in an article that comprises an optical waveguide adapted for guiding light of at least two wavelengths ($\lambda_i$ and $\lambda_j$) in a spectral region of spectral width $\Delta\lambda$. The optical waveguide comprises a length of multimode (exemplarily dual mode) waveguide. The multimode waveguide comprises a blazed refractive index grating of pitch A and blaze angle $\theta$, with A and $\theta$ selected such that the grating causes coupling between the (0,1) and (m,n) modes, exemplarily (1,1), at $\lambda_i$.

Significantly, the blazed grating is a short period grating, with $\Lambda < 1$ µm, $\theta$ greater than $\theta_o$, where $\theta_o$ is the blaze angle that provides optimal coupling between the (0,1) and (m,n) modes for light of wavelength $\lambda_i$; and $\theta$ furthermore is selected such that the grating causes substantially (e.g., at least 50%) less, preferably substantially no (e.g., at least 90% less) reflection of fundamental mode light of wavelength $\lambda_j$ than is caused by an, otherwise identical, comparison grating having $\theta = \theta_o$. It will be appreciated that gratings according to the invention are reciprocal elements, i.e., can couple (0,1) to (1,1), as well as (1,1) to (0,1).

The spectral region of width $\Delta\lambda$ is the spectral region in which the unwanted reflections are of concern. In most cases $\Delta\lambda \leq \lambda_i/100$ ($\lambda_i$ is any one of the wavelengths in $\Delta\lambda$). In a dual mode fiber with composition comparable to that of conventional communications fiber $\Delta\lambda$ can be about 2 nm, but in specialty fibers it can be as large as 10 nm at 1550 or 1300 nm.

MCGs according to the invention are expected to be useful in many cases that involve exposure of a MCG to light of two or more wavelengths, but may of course also be used in single wavelength systems.

DETAILED DESCRIPTION

Figure 1:
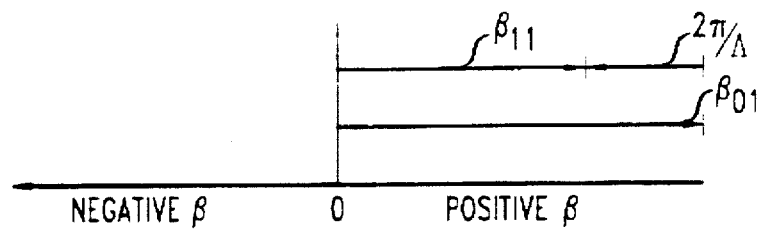
FIG. 1 shows the phase matching condition for a prior art transmissive mode converter.

FIG. 1 illustrates the operational principle of the prior art transmissive MCG of the '209 patent. As is well known, the propagation constant $\Gamma_{mn}$ of a (m,n) mode is equal to $2\pi n_{ef}/\lambda$, where $n_{ef}$ is the effective refractive index of the (m,n) mode, and $\lambda$ is the wavelength. The quantity $2\pi/\Lambda$ of FIG. 1 is equal to $\beta_{01} - \beta_{11}$. This determines the pitch of the grating that provides (0,1)/(1,1) transmissive conversion. The effective refractive index of a given spatial mode at a given frequency can readily be computed by means of a known algorithm. See, for instance, T. Lenahan, *Bell System Technical Journal*, Vol. 62, p. 2663 (1983).

Figure 2:
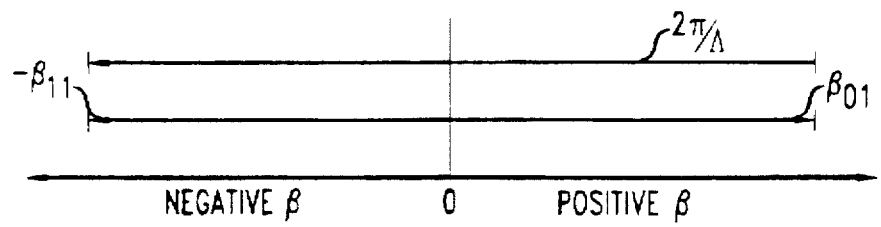
FIGS. 2–3 show phase matching conditions for reflective MCGs according to the invention.

FIG. 2 illustrates the principle of the reflective MCG of the instant invention. The grating pitch is chosen such that $(2\pi/\Lambda) = \beta_{01} + \beta_{11}$, with the propagation constants determined as above. In both cases a predetermined wavelength is assumed. Positive $\beta$ applies to light propagation in one direction, and negative $\beta$ to light propagation in the opposite direction.

Figure 3:
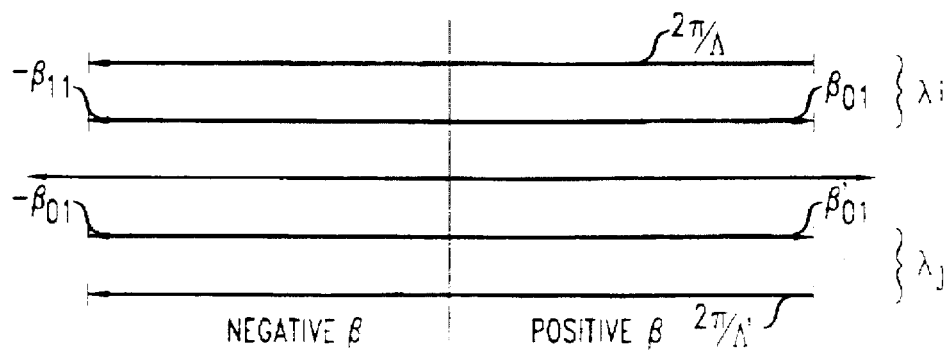

FIG. 3 illustrates the principle of the reflective MCG of the invention in the case of exposure of the grating to two different wavelengths $\lambda_i$ and $\lambda_j$ within $\Delta\lambda$. Unprimed parameters refer to $\lambda_i$, primed parameters to $\lambda_j$. In FIG. 3 it is assumed that $\beta_{01} + \beta_{11} = 2\beta'_{01}$. Therefore $2\pi/\Lambda = 2\pi/\Lambda'$, and the grating with pitch $\Lambda$ not only causes reflective inter-mode coupling between $\beta_{01}$ and $-\beta_{11}$ at $\lambda_i$ but also reflective coupling at $\lambda_j$ between $\beta'_{01}$ and $-\beta_{01}$. As those skilled in the art will appreciate, the condition $62_{01}+\beta_{11}=2\beta'_{01}$ will typically be met for conventional waveguides if both $\lambda_i$ and $\lambda_j$ are in the wavelength region $\Delta\lambda$. Thus, the described undesirable and unintended reflection at a different wavelength can be expected to occur in most, if not all, multiwavelength systems, possibly making conventional MCGs unacceptable in many WDM and other multiwavelength optical systems.

Fortunately, and surprisingly, I have found that for a grating of pitch $\Lambda$ in a given multimode fiber there will substantially always exist a blaze angle $\theta$ that not only yields efficient (though generally not optimal) (0,1)/(m,n) coupling at $\lambda_i$ but also yields low (possibly and preferably essentially zero) (0,1) reflection at $\lambda_j$. The blaze angle $\theta$ is generally greater than $\theta_o$, the blaze angle of an otherwise identical comparison grating that gives optimal coupling at $\lambda_i$, without consideration of coupling at $\lambda_j$.

The reflective MCG of this invention does not substantially suffer from the complicated spectral response of the transmission prior art mode converter. In the latter, small variations of the propagation constant $\beta_{mn}$ (as result from mode degeneracy, as exhibited by ( 1,1 )) result in a relatively large change in the phase matching condition (i.e. in $\Lambda=2\pi/(\beta_{01}-13_{mn})$), whereas in a reflective MCG according to the invention small variations of $\beta_{mn}$ result in relatively small changes in the phase matching condition (i.e. in $\Lambda=2\pi(\beta_{01}+\beta_{mn})$). Specifically, in a reflective (0,1) (1,1) MCG according to the invention the variations due to (1,1) mode degeneracy typically are so small as to be nearly indistinguishable.

A further advantageous feature of reflective MCGs according to the invention is their relatively strong wavelength dependence, which can provide a sharp spectral response that can facilitate discrimination among closely spaced (~1 nm) channels, e.g., in WDM communication systems. The strong wavelength dependence is a consequence of the phase matching condition's dependence on the sum of the two relevant propagation constants. On the other hand, the phase matching condition of the prior art (transmissive) mode converter depends on the difference between the two relevant propagation constants, and typically is relatively weakly wavelength dependent.

Reflective MCGs according to the invention are also substantially free of the previously recited shortcomings of the reflective gratings of '624. For instance, the MCG according to the invention is substantially polarization-independent, and is a readily manufacturable, robust integrated structure that can provide high reliability. Finally, the inventive MCGs are, by definition, substantially free of the unwanted reflections that are a feature of the prior art devices.

Although it is possible, at least in principle, to determine the appropriate value of the blaze angle $\theta$ by calculation (exemplarily using the method of Lenahan, op. cit.), the appropriate blaze angle currently typically is most advantageously found by a process of successive approximation, illustrated by FIGS. 4a–h. The main reason for preferring successive approximation of $\theta$ to determination of $\theta$ by calculation is found in, essentially unavoidable, manufacturing imperfections, e.g., grating imperfections (e.g., small variations in refractive index difference $\Delta n$ across the core) that can have a relatively large effect on $\theta$, but that would at best be difficult to determine quantitatively, and to account for in a calculation of $\theta$. A currently preferred practical approach comprises calculation (or estimation) of a starting blaze angle (e.g., of $\theta_o$), followed by experimental determination (e.g., by making a series of gratings of increasing blaze angle, and measurement of the spectral properties of the gratings) of the appropriate $\theta$.

FIGS. 4a–h illustrate the evolution of the normalized transmission spectrum of exemplary gratings in dual mode fiber as a function of blaze angle. The fiber was a dual mode germano-silicate fiber having $\Delta n=0.51$ and cut-off wavelength 1750 nm. The gratings were nominally identical except for the blaze angle, with essentially identical grating length and total UV exposure for all gratings. The short wavelength, broadband loss is the known radiation mode loss which is present in all UV-induced Bragg gratings. The long-wavelength dip in the spectra corresponds to the reflective (0,1)/(0,1) mode conversion, and the dip at intermediate wavelength corresponds to the reflective (0,1)/(1,1) conversion. The fine structure observed on the short wavelength side of each of the reflections are Fabry-Perot resonances that can be reduced or eliminated by appropriate apodization of the grating over its length, as is known to those skilled in the art. FIGS. 4a–h clearly show that $\theta_o$ for the exemplary grating is about 3.5°, and that $\theta=6.5°$ provides essentially complete elimination of (0, 1 )/(0, 1 ) reflective conversion.

Figure 4:
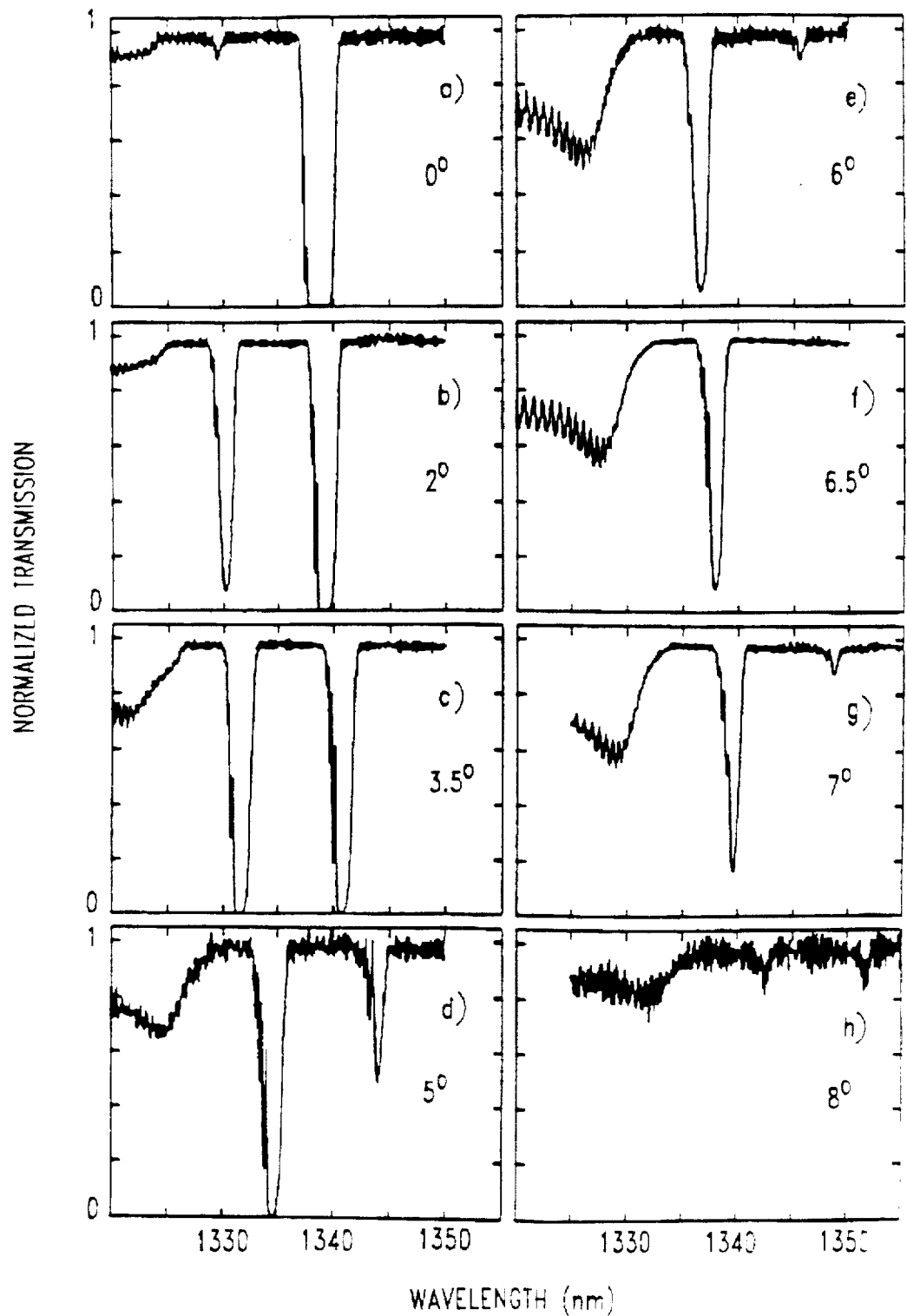
FIGS. 4a–h show data of normalized transmission through nominally identical (except for $\theta$) reflective MCGs, as a function of wavelength, for different values of $\theta$.
Figure 5:
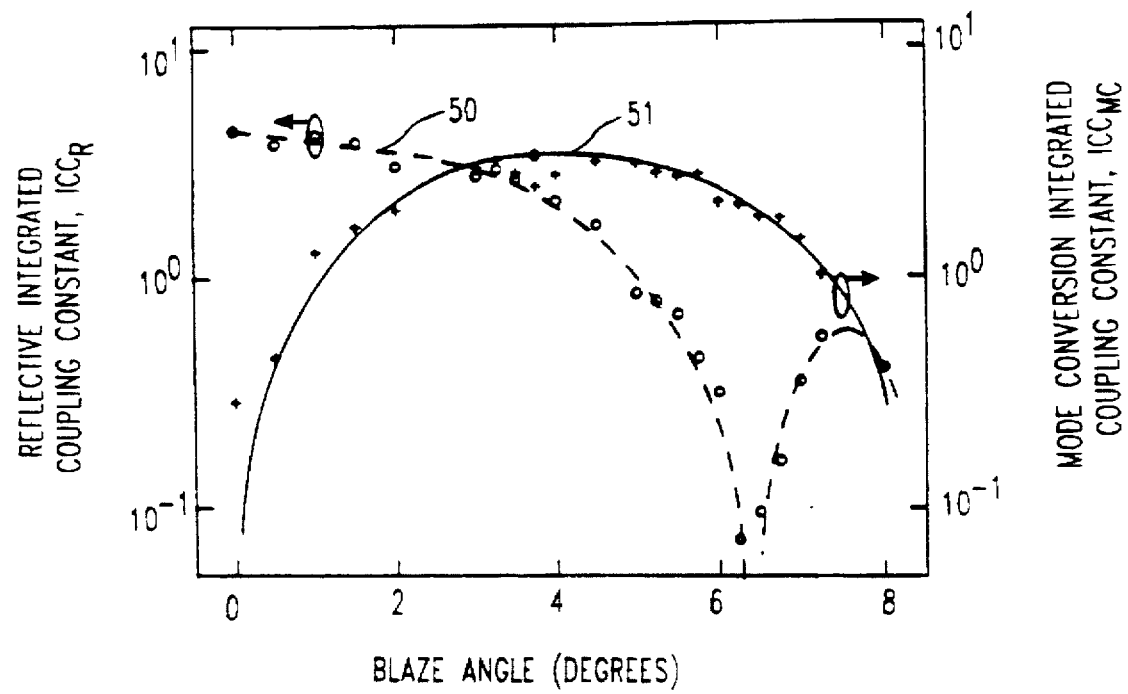
FIG. 5 presents exemplary data on the Reflective Integrated Coupling Constant ($ICC_R$) and Mode Conversion Integrated coupling constant ($ICC_{MC}$) as a function of maze angle.

FIG. 5 shows exemplary data on coupling strengths as a function of blaze angle, for a multitude of gratings in the fiber, and using the exposure conditions of FIG. 4. Reflective Integrated Coupling Constant ($ICC_R$) (curve 50) pertains to the (0, 1)/(0,1) coupling strength, and Mode Conversion Integrated Coupling Constant ($ICC_{MC}$) (curve 51) pertains to the (0,1)/(1,1) coupling strength. As can be readily seen, maximum ($ICC_{MC}$) occurs at a value of $\theta$ less than the value that provides minimum $ICC_R$. The coupling constants are conventionally determined by means of the expression ICC= $\tanh^{-1}(R^{1/2})$, where R is the maximum reflectivity of a grating.

Figure 6:
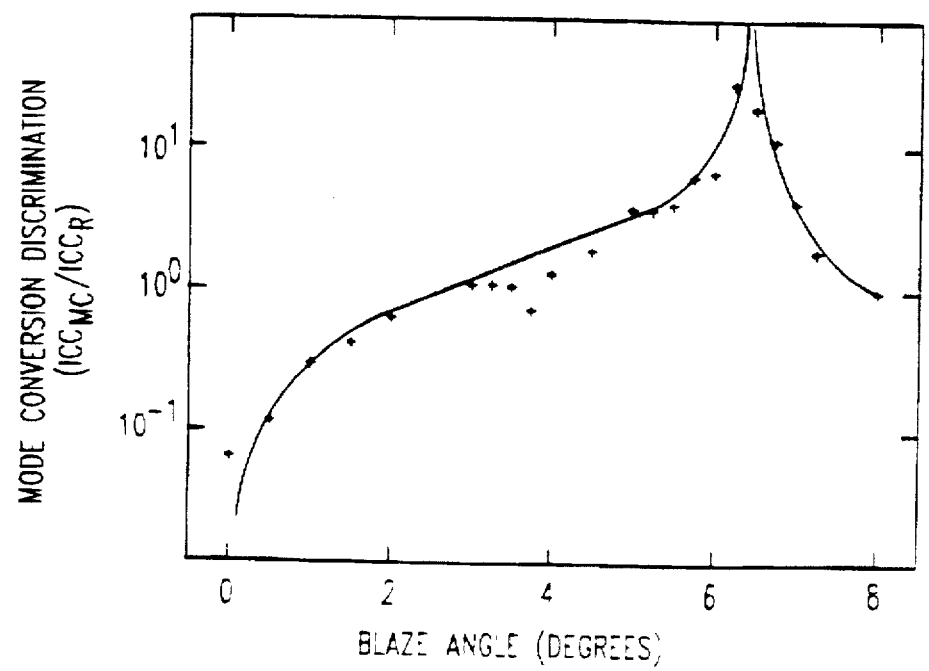
FIG. 6 shows the data of FIG. 5 as $ICC_{MC}/ICC_R$ vs. $\theta$.

FIG. 6 shows the data of FIG. 5 in the form of the ratio $ICC_{MC}/ICC_R$ vs $\theta$. The figure illustrates the fact that the discrimination against (0,1)/(0,1) reflection is a strong function of blaze angle, with as little as 0.1° change in the blaze angle having significant effect on the strength of (0,1)/(0,1) coupling. As those skilled in the art will appreciate, the exact shape of curve 51 and, especially, curve 50 is dependent on fiber design and wavelength. However, the approximate shape of the curve of FIG. 6 is expected to be widely applicable to optical fibers. Similar curves will be found for other optical waveguides.

Figure 7:
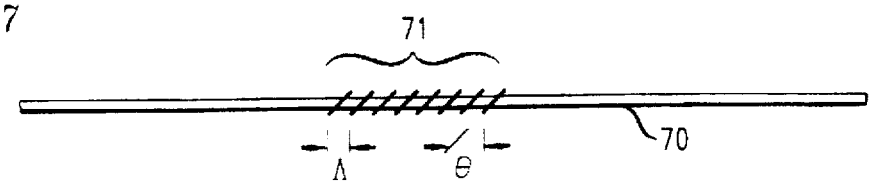
FIG. 7 schematically illustrates aspects of an MCG.

FIG. 7 schematically depicts an exemplary MDC according to the invention, wherein numeral 70 refers to a dual mode optical fiber, exemplarily having a Ge-doped silica core surrounded by silica cladding, and numeral 71 refers to the blazed refractive index grating. The grating is indicated in conventional fashion by a set of basically transverse lines. This does not imply the existence of refractive index variations in the fiber cladding. FIG. 7 also indicates the grating repeat distance $\Lambda$ and the blaze (or tilt) angle $\theta$.

Figure 8:
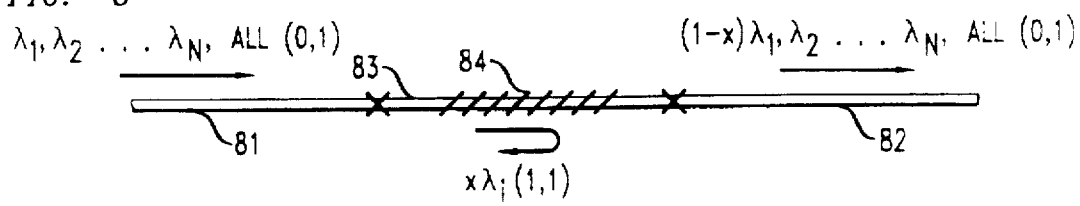
FIG. 8 schematically depicts a relevant portion of an optical fiber communication system that comprises an MCG according to the invention.

FIG. 8 schematically depicts a relevant portion of an exemplary optical waveguide system that comprises an MCG according to the invention, wherein the MCG serves as a wavelength-dependent loss element. (0,1) light of wavelengths $\lambda_1, \lambda_2 \ldots \lambda_N$ propagates through single mode fiber 81 to dual mode fiber 83, wherein a fraction x of (0,1) light is reflected by blazed grating 84 as (1,1) . 1. The reflected light thus is in an odd spatial mode, with zero net overlap with the even spatial mode of the single mode fiber 81, and therefore will have substantially no coupling to this fiber, and be lost from the fiber within a distance of centimeters. Single mode fiber 82 is spliced to the dual mode fiber and receives essentially unattenuated (0,1) light of wavelengths $\lambda_2 \ldots \lambda_N$, as well as the remaining fraction (1–x) of (0,1) $\lambda_1$. The fraction x of reflected light is readily controllable through choice of grating strength.

Figure 9:
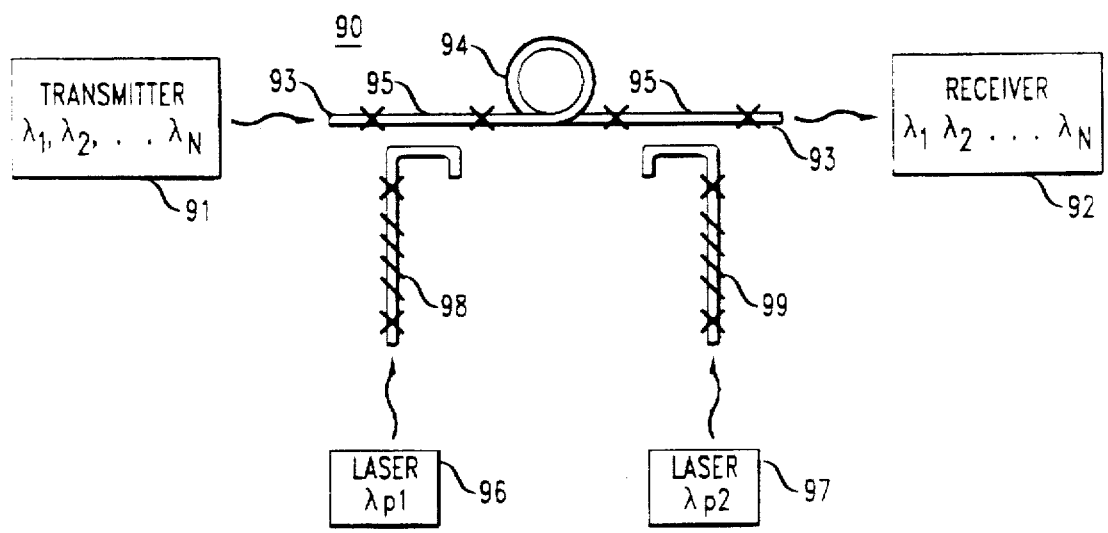
FIGS. 9 and 10 show schematically respective exemplary optical waveguide systems that comprise an MCG according to the invention.

FIG. 9 schematically shows an exemplary optical waveguide system that comprises an MCG according to the invention.

Optical fiber communication systems with co- and counter-pumped optical fiber amplifier are known, including such systems that use separate laser diodes for co- and counter-pumping. This is in principle a very desirable arrangement, especially for high output power optical fiber amplifiers. However, the arrangement is subject to mode beating instabilities in the wavelength and intensity of the pump lasers, and therefore of the amplifier output, due to pump crosstalk problems caused by unabsorbed pump radiation from one pump laser interacting with the other pump laser. The conventional solution to this problem is provision of optical isolators, typically between pump lasers and the respective fiber couplers. However, optical isolators have significant insertion loss, and are relatively costly. A more advantageous solution is provided by means of MCGs, as is shown schematically in FIG. 9, wherein numeral 90 refers to a WDM optical fiber communication system (wavelengths $\lambda_1, \lambda_2 \ldots \lambda_N$) with co- and counter-pumped optical fiber amplifier. Numerals 91–94 refer to, respectively, a multi-wavelength transmitter, multiwavelength receiver, conventional single mode optical transmission fiber, and amplifier fiber (e.g., Er-doped fiber). Numeral 95 refers to conventional fiber couplers (frequently referred to as "WDMs"), 96 and 97 refer to diode pump lasers (wavelengths $\lambda_{p1}$ and $\lambda_{p2}$, respectively), and 98 and 99 refer to MCGs according to the invention. Pump wavelengths $\lambda_{p1}$ and $\lambda_{p2}$ are closely spaced (e.g., ~1 nm) but different. MCG 98 passes $\lambda_{p1}$ radiation toward the amplifier fiber with minimal loss but offers high transmissive loss for $\lambda_{p2}$ radiation propagating towards laser 96, and MCG 99 performs analogously. The MCGs thus prevent inter-laser interaction.

MCGs are advantageously used as indicated above because of their ability to offer a high (e.g., T<–20 dB) transmissive loss with minimal (e.g., R<–20 dB) back reflection at one wavelength (e.g., $\lambda_{p1}$), with minimal (e.g., <0.2 dB) insertion loss at a closely spaced (e.g., ~1 nm) different wavelength (e.g., $\lambda_{p2}$). Thus, both $\lambda_{p1}$ and $\lambda_{p2}$ can be within about 1 nm of the wavelength that gives optimum amplifier performance. This can be a significant advantage for at least some optical fiber amplifiers, e.g., for amplifiers with strong spectral dependence of the absorption. It will be appreciated that system 90 is not necessarily a WDM system, and that the MCGs could also be advantageously used in a single channel system.

Figure 10:
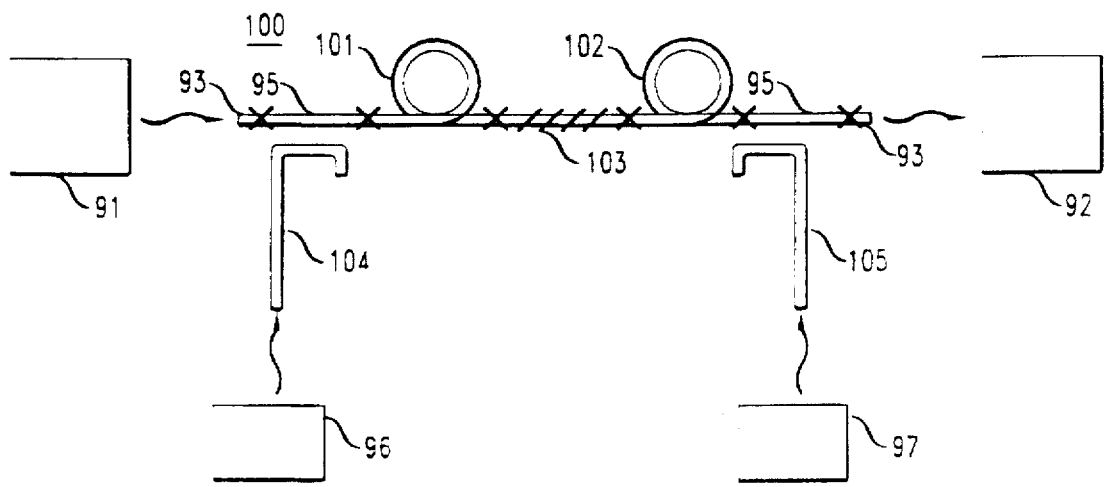

FIG. 10 schematically depicts an exemplary optical fiber communication system 100 with dual stage optical amplifier, with MCG wavelength-dependent loss element 103 provided for gain flattening. Like numerals in FIGS. 9 and 10 refer to like features. Numerals 101 and 102 refer to the first and second optical amplifier stages, respectively. If desired, MCGs corresponding to elements 98 and 99 of FIG. 9 could be inserted in fibers 104 and 105, respectively. Typically it will be desirable to provide an optical isolator between stages of the amplifier to prevent ASE amplification. Exemplarily an isolator (not shown) is placed between elements 101 and 103 in FIG. 10.

As is well known, optical fiber amplifiers (e.g., Er-doped fiber amplifiers) typically do not have flat gain over the spectral range of interest, and gain flattening elements such as tilted Bragg gratings, long period gratings or thin film filters are frequently provided.

I have found that one or more MCGs according to the invention can advantageously be used to flatten the gain of a (single or multistage) optical fiber amplifier. For instance, if the gain spectrum of an amplifier has sharp spectral features an MCG loss element as described above can be used advantageously, since such a loss element can have sharper (e.g., ~1 nm) spectral response than is typically attainable with prior art gain flattening elements. On the other hand, an appropriately chirped MCG (i.e., an MCG having axially varying grating spacing $\Lambda(z)$, where z is the axial coordinate), with or without axially modulated strength of the grating elements (i.e., the peak-to-valley periodic refractive index change $\Delta n = \Delta n(z)$) can have a complex transmission spectrum, with variations over a relatively wide spectral region (e.g., several tens of nm). By appropriate choice of grating parameters, including $\Lambda(z)$ and $\Delta n(z)$, it is possible to provide a MCG wavelength-dependent loss element having a transmission spectrum that is substantially the inverse of the amplifier gain spectrum, such that the amplifier output has a broader spectral region of uniform gain.

Figure 11:
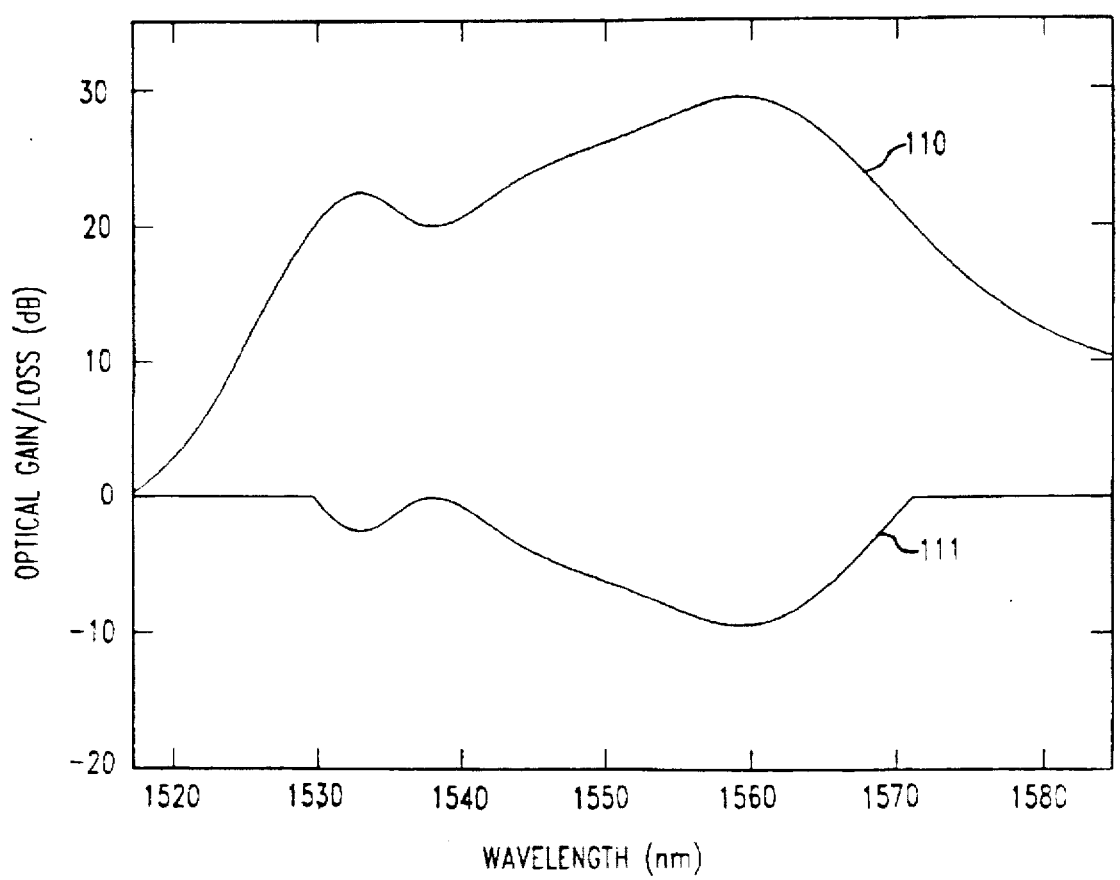
FIG. 11 schematically shows an exemplary complex transmission spectrum of a MCG wavelength-dependent loss element according to the invention.

FIG. 11 schematically depicts an exemplary amplifier gain spectrum 110 and an exemplary transmission spectrum 111 of an appropriately chirped and index modulated MCG.

EXAMPLE

A dual mode germano-alumino-silicate fiber with $\Delta n = 0.044$ and cut-off wavelength 1750 nm was photosensitized by loading the fiber with 2.8 mol % molecular deuterium in conventional fashion. The fiber was exposed through a phase mask for 142 seconds to a 3 mm×0.6 mm FWHM Gaussian beam from an excimer-pumped, frequency-doubled dye laser. The laser output was 30 Hz at 242 nm, with a fluence of 25 mJ/pulse/cm$^2$, with the 3 mm beam dimension aligned with the axis of the fiber. The zero order-nulled phase mask had a period $\Lambda_o$ of 0.903 µm, with a tilt angle θ of the grating lines that was varied in successive steps from normal to the fiber axis to 8° to the fiber axis. The transmission spectra of the respective gratings were determined in conventional fashion, yielding the results shown in FIGS. 4a–h. By means of the successive measurements it was established that the optimal grating blaze angle for the particular fiber and wavelength range was about 6°15'. Within the reproducibility of fiber positioning, the periodic index variation created along the length of the fiber varied with mask tilt angle θ according to $\Lambda \cong \Lambda_o/2\cos\theta$. The grating performs as expected, including (0,1)/(1,1) coupling.

The invention claimed is:

1. An article comprising an optical waveguide adapted for guiding electromagnetic radiation of at least two wavelengths $\lambda_i$ and $\lambda_j$ in a spectral region of spectral width $\Delta\lambda$, said optical waveguide comprising a length of multimode optical waveguide, said length of multimode optical waveguide comprising a blazed refractive index grating of pitch $\Lambda$ and blaze angle θ, with $\Lambda$ and θ selected such that the grating causes coupling between a symmetric fundamental spatial mode of electromagnetic radiation of wavelength $\lambda_i$ and a higher order spatial mode of said electromagnetic radiation of wavelength $\lambda_i$;

CHARACTERIZED IN THAT a) the blazed refractive index grating is a short-period refractive index grating, with $\Lambda < 1$ µm;

b) the blaze angle θ is greater than $\theta_o$, where $\theta_o$ is a blaze angle that provides essentially optimal coupling between said symmetric fundamental spatial mode and said higher order spatial mode for electromagnetic radiation of wavelength $\lambda_i$; and c) θ is selected such that the grating causes substantially less reflection of said symmetric fundamental mode radiation of wavelength $\lambda_j$ than is caused by an, otherwise identical, comparison grating having θ=θ$_o$.

2. Article according to claim 1, wherein θ is selected such that the grating causes at least 50% less reflection of said symmetric fundamental mode radiation of wavelength $\lambda_j$.

3. Article according to claim 2, wherein θ is selected such that the grating causes at least 90% less reflection of said symmetric fundamental mode radiation of wavelength $\lambda_j$.

4. Article according to claim 1, wherein said higher order spatial mode is an antisymmetric higher order spatial mode.

5. Article according to claim 4, wherein said dual-mode optical waveguide is a multimode optical fiber, and said antisymmetric higher order spatial mode is a $LP_{11}$ mode.

6. Article according to claim 1, wherein the optical waveguide is adapted for guiding electromagnetic radiation of N different wavelengths $\lambda_1 \ldots \lambda_N$, where N≥2, and wherein Δλ is less than about 0.01 $\lambda_i$ where i is any of 1 to N.

7. Article according to claim 2, wherein the article is an N-channel wavelength division multiplexer optical communication system.

8. Article according to claim 1, wherein said length of multimode optical waveguide is a length of dual mode optical waveguide disposed between, and abuttingly connected to, a first and second single mode optical waveguide, and wherein said blazed short-period refractive index grating is selected to reflect a predetermined fraction of said symmetric fundamental spatial mode electromagnetic radiation of wavelength $\lambda_i$ that propagates from said first single mode optical waveguide into said dual mode optical waveguide in said higher order spatial mode, the remaining symmetric fundamental spatial mode electromagnetic radiation of wavelength $\lambda_i$ propagating from said length of dual mode optical waveguide into said second single mode optical waveguide, and said reflected higher order spatial mode radiation propagating from said length of dual mode optical waveguide into said first single mode optical waveguide and becoming lost from the first single mode optical waveguide, said length of dual mode optical waveguide to be referred to as a wavelength-dependent loss element.

9. Article according to claim 1, wherein said article is an optical waveguide system comprising a source of said electromagnetic radiation of wavelength $\lambda_i$ and $\lambda_j$, further comprising utilization means for said electromagnetic radiation of wavelength $\lambda_i$ and $\lambda_j$, and said optical waveguide radiation-transmissively connects said source and said utilization means.

10. Article according to claim 9, wherein said length of multimode optical waveguide is disposed between a first and a second length of single mode optical waveguide, said length of multimode optical waveguide providing a predetermined loss for electromagnetic radiation of one of said wavelengths $\lambda_i$ and $\lambda_j$, and provides essentially no loss for electromagnetic radiation of the other of said wavelengths $\lambda_i$ and $\lambda_j$, said length of multimode optical waveguide to be referred to as a wavelength-dependent loss element.

11. Article according to claim 10, the article comprising an optical waveguide amplifier, with said wavelength-dependent loss element disposed between a first and a second stage of said optical waveguide amplifier.

12. Article according to claim 10, the article comprising an optical waveguide amplifier, and a first and a second source of pump radiation, respectively radiation-transmissively connected to said optical waveguide amplifier, with the wavelength-dependent loss element disposed between at least one of said first and second sources of pump radiation and said optical waveguide amplifier.

13. Article according to claim 1, wherein said optical waveguide is optical fiber, the symmetric fundamental spatial mode is the $LP_{01}$ spatial mode, the higher order spatial mode is the $LP_{11}$ spatial mode, $\lambda_i$ is in the spectral range 900–1650 nm, and Δλ is less than about 10 nm.

14. Article according to claim 8, wherein Λ=Λ(z), with z being the axial coordinate of said length of multimode optical waveguide, and Λ(z) is non-constant over the length of the refractive index grating, with Λ(z) selected such that the wavelength-dependent loss element has substantial loss over a wavelength range greater than about 1 nm.

15. Article according to claim 8, wherein a strength Δn of the refractive index grating is Δn(z), with z being the axial coordinate of said length of multimode optical waveguide, and Δn(z) is non-constant over the length of the refractive index grating, with Δn(z) selected such that the wavelength-dependent loss element has a wavelength-dependent substantial loss over a wavelength range greater than about 1 nm.

16. Article according to claim 14, wherein a strength Δn of the refractive index grating is Δn(z), with Δn(z) being non-constant over the length of the refractive index grating, with Δn(z) and Λ(z) selected such that the wavelength-dependent loss element has a wavelength-dependent substantial loss over a wavelength range greater than about 2 nm.

17. Article according to claim 11, wherein said wavelength-dependent loss element has Λ=Λ(z) and refractive index grating strength Δn=Δn(z), with z being the axial coordinate of the length of multimode optical waveguide, with each of Λ(z) and Δn(z) being non-constant over the length of the refractive index grating, with Λ(z) and Δn(z) selected such that the wavelength-dependent loss element has a wavelength-dependent substantial loss over a wavelength range greater than about 2 nm.

18. Article according to claim 17, wherein Λ(z) and Δn(z) are selected such that the wavelength-dependent loss is substantially an inverse of a gain curve of said optical waveguide amplifier over a spectral range of more than 2 nm.

* * * * *